Aug. 1, 1950 R. W. LEMM 2,517,327
MILKING MACHINE PULSATOR
Filed Nov. 14, 1947 3 Sheets-Sheet 1
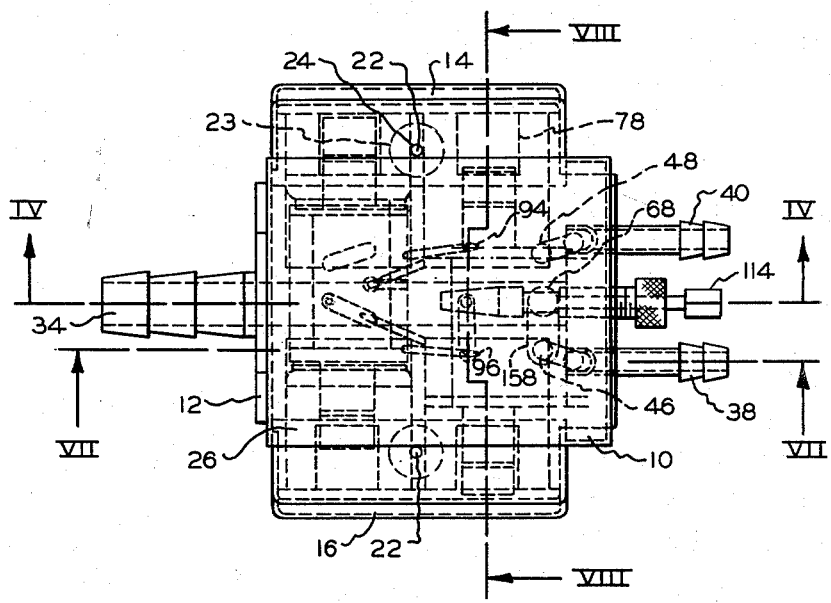
FIG. I.
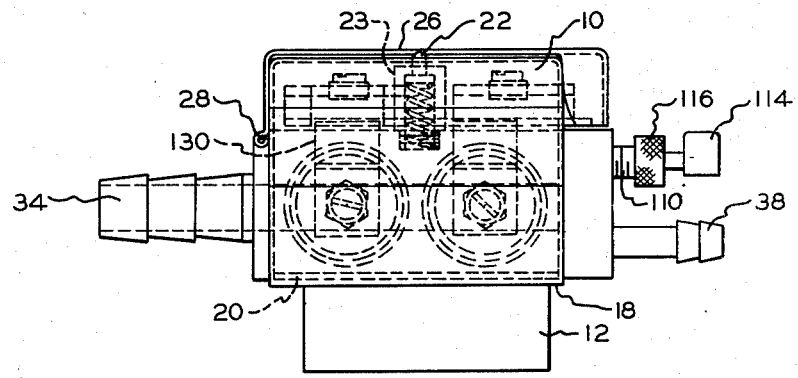
FIG. II.
Inventor
ROBERT W. LEMM
By Beaman & Patch
Attorneys Aug. 1, 1950   R. W. LEMM   2,517,327
MILKING MACHINE PULSATOR
Filed Nov. 14, 1947   3 Sheets-Sheet 2
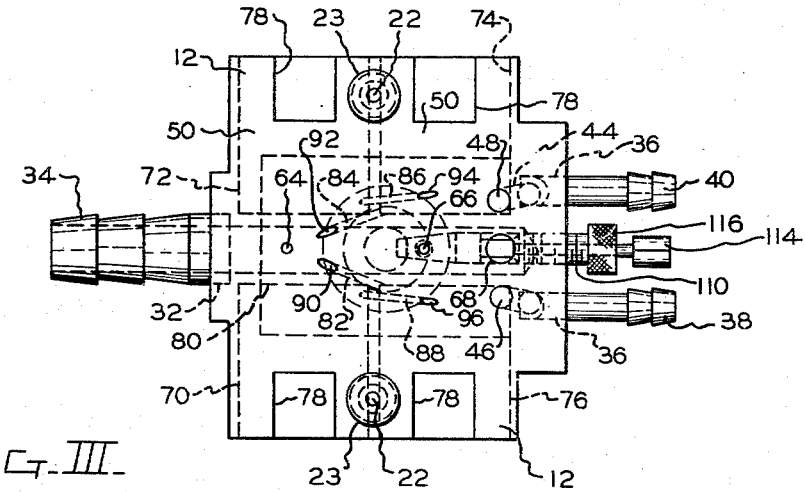
FIG. III
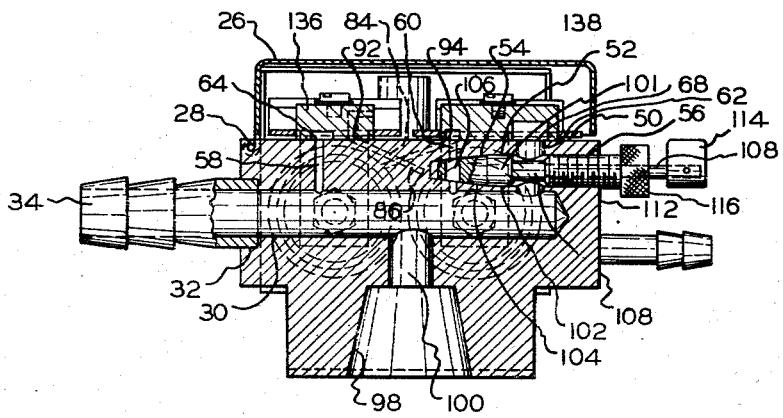
FIG. IV
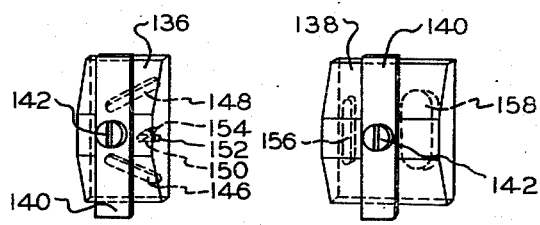
FIG. V   FIG. VI
Inventor
ROBERT W. LEMM
By Beaman & Patch
Attorneys Aug. 1, 1950     R. W. LEMM     2,517,327
MILKING MACHINE PULSATOR
Filed Nov. 14, 1947     3 Sheets-Sheet 3
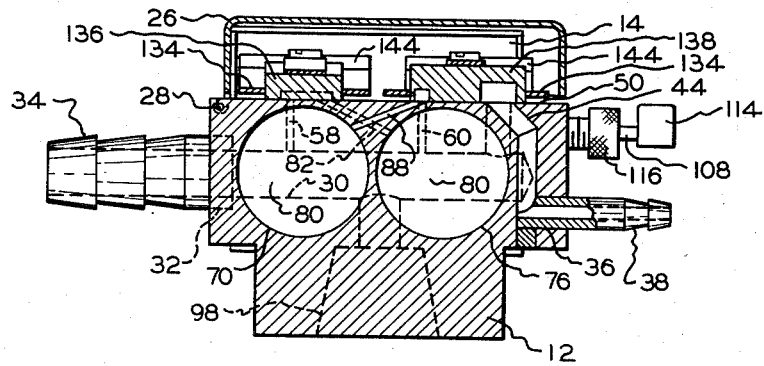
FIG. VII.
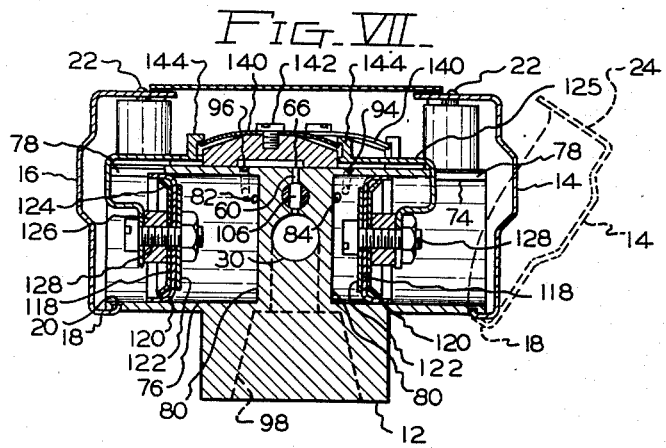
FIG. VIII.
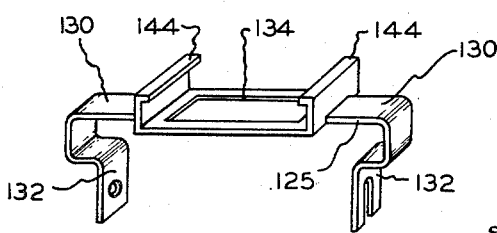
FIG. IX.
Inventor
ROBERT W. LEMM
By Beaman & Patch
Attorneys Patented Aug. 1, 1950

2,517,327

UNITED STATES PATENT OFFICE 2,517,327

MILKING MACHINE PULSATOR

Robert W. Lemm, Grass Lake, Mich.

Application November 14, 1947, Serial No. 785,863

4 Claims. (Cl. 31—61)

The present invention relates to improvements in pulsators used in milking machines to alternate conditions of vacuum and pressure within the teat cups.

It is an object of the present invention to provide an improved pulsator characterized by the ease with which it may be cleaned in service.

Another object is to provide an improved pulsator which may be disassembled without tools in order to clean the straight, short holes extending between the valves and the cylinder.

A further object is to provide a pulsator which may be economically manufactured with a minimum of parts yet is fully housed against exterior dirt and dust.

These and other objects and advantages residing in the arrangement, combination, and construction of parts will more fully appear from the following specifications and the annexed claims.

In the drawings,

Fig. I is a plan view of the illustrated form of the invention with the dust covers in position, Fig. II is a side view of Fig. I, Fig. III is a view similar to Fig. I with the dust covers and pistons removed, Fig. IV is a sectional view taken on line IV—IV of Fig. I, Fig. V and VI are perspective views of the valve plates, Fig. VII is a sectional view taken on line VII—VII of Fig. I, Fig. VIII is a sectional view taken on line VIII—VIII of Fig. I, and Fig. IX is a perspective view of the piston and valve frame.

Referring to the drawings, the pulsator 10 comprises a main body 12 which is preferably in the form of a one-piece metal from which the cylinders, parts and passages are machined. For dust proofing the working parts of the pulsator, bodily removable side covers 14 and 16 having lower edge flanges 18 to hinge in grooves 20 extending the length of the body 12, are held in position by spring urged detents 22, carried by posts 23, projecting into apertures 24, overlapping the covers 14 and 16 to complete the housing is a top cover 26 hinged at 28.

The main body 12, as more clearly shown in Figs. III and IV, a main suction hole 30 is drilled in from the left end and counter sunk at 32 to receive the suction line nipple 34. At the right end the body 12 is drilled to provide holes 36 to receive the vacuum cup nipples 38 and 40. Angularly disposed hole 42 and 44 intersect the holes 36 and provide parts 46 and 48 in the top surface 50 of the body 12. Also from the right end, a hole 52 is drilled then re-armed on a taper at 54, and tapped at 56, to receive the speed regulating valve assembly. Drilled downwardly as viewed in Fig. IV into the suction hole 30, are suction holes 58, 60, and 62 providing parts 64, 66, and 68, respectively, in the top surface 50. It will be noted that the holes 60 and 62 have intersections, intermediate their length, with the hole 52.

Drilled and re-armed inwardly from the top and bottom of the body 12, as viewed in Fig. III, are open ended cylinders 70, 72, 74, and 76. Milled through the top surface 50 into the walls of the cylinders 70, 72, 74, and 76 are slots 78. Inner walls 80 constitute the heads of the cylinders 70, 72, 74, and 76. Short, straight, angularly disposed holes 82, 84, 86, and 88, providing parts 90, 92, 94, and 96 in the surface 50, open into the cylinders 76, 74, 72, and 70, respectively, directly adjacent the walls 80. The flared aperture 98 connected to the suction hole 30 by the hole 100 affords a socket for mounting the pulsator on the top of the milk pail so a constant vacuum condition will be maintained in the pail.

The speed regulating valve 101 shown in Figs. III and IV has a main cylindrical portion 102 fitted for free rotation in the cylindrical unthreaded portion of the hole 52. The tapered end portion 104, seated in the tapered portion 54 of the hole 52 is provided with a cross hole 106 aligned with the suction hole 60. The shank 108 of the valve 101 is reduced in diameter in alignment with the hole 62 to avoid objectionable restriction of the hole 62. Further reduction in the diameter of the shank 108 takes place through the threaded locking sleeve 110 from a point at the shoulder 112 against which the sleeve 110 acts to hold the valve 101 in position of adjustment. An indicator 114 on the shank 108 shows the location of the cross hole 106. The sleeve 110 has a knurled head 116 to enable the same to be rotated by the fingers in the threaded portion 56 to regulate the pressure against the shoulder 112 of the valve 101. With the pressure released, the valve 101 may be rotated by turning the indicator 114 to vary the alignment between the cross hole 106 and the suction hole 60.

The pistons 118 have cup packings 120 held by plates 122 and 124 all clamped together upon the valve plate frames 125 by spacers 126 and bolts 128. As shown in Fig. IX, the frames 125 have portions 130 which operate in the slots 78 and inward portions 132 against which the spacers 126 are clamped to position the pistons 118 inwardly toward the walls 80. The central apertured portions 134 are shaped to receive the valve plates 136 and 138 shown in Figs. V and VI. Spring arms 140 are swiveled on screws 142 to engage beneath the flanges 144 to hold the valve plates 136 and 138 firmly against the surface 50.

The valve plate 136 has elongated ports 146 and 148 in the form of recesses in the lower surface which slides on the surface 50. Between the ports 146 and 148 is a passage 150 connecting an atmospheric port 152 with a port 154 in the lower surface of the plate 136.

Valve plate 138 has elongated ports 156 and 158 in the form of recesses in the lower face of the valve plate.

In order to alternately connect the nipples 38 and 40 to vacuum and atmospheric pressures, the valve plate 138 must be reciprocated to enable the port 158 to alternately connect the ports 46 and 48 with the suction port 88. With the plate 138 at the ends of its stroke first the port 46 and then the port 48 is uncovered by the plate 138 to admit atmospheric pressure. In a similar manner the port 156 alternately connects the ports 94 and 96 to the suction port 66, the ports 94 and 96 being alternately uncovered by the plate 138 at the end of each stroke to open these ports to atmospheric pressure.

The valve plate 136 alternately subjects the pistons 118 in the cylinders 74 and 76 to suction and pressure by alternately connecting the ports 90 and 92 with the suction port 64 through the ports 146 and 148 while alternately connecting the ports 90 and 92 to atmosphere through the port 154. The rate of movement of the pistons 118 in the cylinders 70 and 72 is regulated by the position of the cross slot 106 in the hole 60 and this in turn controls the rate of operation of the piston 118 in the cylinders 74 and 76.

As will be appreciated from a consideration of Figs. III and IV, the holes 82, 84, 86, and 88, are all short and straight and may be conveniently cleaned with a wire. This is also true with respect to the suction holes 58 and 60. By depressing the arms 140 with the fingers and partially rotating the same out from under the flange 144, the valve plates 136 and 140 may be removed to expose all of these holes for cleaning.

Having thus described my invention, what I claim as new and desire to protect by Letters Patent is:

1. A pulsator for milking machines, comprising a block structure including a pair of axially aligned opposed cylinders, said block structure including also a wall separating said cylinders and having also an exterior valve seat surface, said cylinders being closed at their opposed ends by said wall and being open at the ends thereof remote from said wall, pistons in said cylinders, a combination piston connecting and valve actuating frame in the form of a yoke connected to said pistons on the sides thereof remote from said wall and extending outside said cylinders and wall in overlying relationship to said valve seat surface, said yoke being adapted to cause said pistons to have unitary movement in said cylinders, passage means in said wall adapted to be connected to a suction source and ports defined in said block structure and connecting said passage means with the cylinder spaces defined between said wall and said pistons, said ports being open to said valve seat surface, and a valve member removably secured on said frame and engaging with said valve seat surface, said valve member having unitary movement with said frame and pistons and being removable to expose said ports for cleaning.

2. A pulsator for milking machines as claimed in claim 1, said yoke frame having an opening therein normally closed by said valve member, and means removably securing said valve member upon said frame in closing relation to said opening and in sealed seating relation to said valve seat surface.

3. A pulsator for milking machines as claimed in claim 1, said yoke frame having end portions slidable within the outer end portions of said cylinders, and means removably securing said pistons upon said frame end portions.

4. A pulsator for milking machines as claimed in claim 1, cover plate anchor means on said block structure, and detachable end cover plates adapted to engage said anchor means and to close the open ends of the cylinders.

ROBERT W. LEMM.

REFERENCES CITED

The following references are of record in the file of this patent:

UNITED STATES PATENTS

| Number | Name | Date |
|---|---|---|
| 833,475 | Morrow | Oct. 16, 1906 |
| 1,814,903 | Dobrowsky | July 14, 1931 |
| 1,875,083 | McCornack | Aug. 30, 1932 |
| 2,061,898 | De Motte | Nov. 24, 1936 |
| 2,211,012 | Hodsdon | Aug. 13, 1940 |
| 2,253,341 | Michaels | Aug. 19, 1941 |
| 2,333,019 | Lemm | Oct. 29, 1943 |
| 2,419,844 | McArthur et al. | Apr. 29, 1947 |